US010967481B2

(12) United States Patent
Dan

(10) Patent No.: US 10,967,481 B2
(45) Date of Patent: Apr. 6, 2021

(54) CMP LAYER BASED ON POROUS CERIUM OXIDE AND PREPARATION METHOD THEREOF

(71) Applicant: Hubei Dinghui Microelectronics Materials Co., LTD, Wuhan (CN)

(72) Inventor: Wentao Dan, Sichuan (CN)

(73) Assignee: Hubei Dinghui Microelectronics Materials Co., LTD, Wuhan (CN)

( * ) Notice: Subject to any disclaimer, the term of this patent is extended or adjusted under 35 U.S.C. 154(b) by 190 days.

(21) Appl. No.: 16/186,575

(22) Filed: Nov. 11, 2018

(65) Prior Publication Data

US 2019/0076983 A1    Mar. 14, 2019

(30) Foreign Application Priority Data

Aug. 3, 2018    (CN) .......................... 2018 1 0875213

(51) Int. Cl.
*B24B 37/24* (2012.01)
*B24B 37/22* (2012.01)
*C09K 3/14* (2006.01)

(52) U.S. Cl.
CPC .............. *B24B 37/24* (2013.01); *B24B 37/22* (2013.01); *C09K 3/14* (2013.01); *C09K 3/1409* (2013.01)

(58) Field of Classification Search
None
See application file for complete search history.

(56) References Cited

U.S. PATENT DOCUMENTS

| 6,343,976 | B1 * | 2/2002 | Yoshida | ............ H01L 21/31053 |
| | | | | 451/41 |
| 2005/0036928 | A1 * | 2/2005 | Katusic | .................. B01J 35/023 |
| | | | | 423/263 |
| 2005/0101227 | A1 * | 5/2005 | Balijepalli | .............. B24B 49/16 |
| | | | | 451/41 |
| 2010/0317263 | A1 * | 12/2010 | Hirose | ............... C08G 18/4277 |
| | | | | 451/41 |

FOREIGN PATENT DOCUMENTS

| CN | 103818943 A | 5/2014 |
| CN | 103862365 A | 6/2014 |

* cited by examiner

*Primary Examiner* — Bryan D. Ripa
*Assistant Examiner* — Ross J Christie
(74) *Attorney, Agent, or Firm* — Cooper Legal Group, LLC

(57) ABSTRACT

The present invention relates to a technical field of CMP pad manufacture, and more particularly to a CMP layer based on porous cerium oxide and a preparation method thereof. The CMP layer of the present invention is formed by mixing and curing a polyurethane prepolymer, a crosslinking agent and the porous cerium oxide, including steps of preheating the polyurethane prepolymer under vacuum, then adding a porous cerium oxide filler to the polyurethane prepolymer, and thoroughly mixing to obtain a mixed prepolymer; moving the mixed prepolymer to a first tank, and performing heat preservation, stirring, and circulation treatments; adding the crosslinking agent to a second tank and performing a melting treatment; correcting an injection weight ratio of the first tank and the second tank, then rapidly mixing, so as to inject into the mold; and then curing and vulcanizing to obtain the polishing layer.

3 Claims, 2 Drawing Sheets

CMP LAYER BASED ON POROUS CERIUM OXIDE AND PREPARATION METHOD THEREOF

CROSS REFERENCE OF RELATED APPLICATION

The present invention claims priority under 35 U.S.C. 119(a-d) to CN 201810875213.7, filed Aug. 3, 2018.

BACKGROUND OF THE PRESENT INVENTION

Field of Invention

The present invention relates to a technical field of CMP pad manufacture, and more particularly to a CMP layer based on porous cerium oxide and a preparation method thereof.

Description of Related Arts

CMP (chemical mechanical polishing) is a micro-nano processing technology that combines mechanical grinding and chemical oxidation to remove the surface material of the workpiece. This technology can make the surface of the workpiece to be ultra-flat and ultra-smooth, mainly used in IC and MEMS manufacturing, During CMP, the rotating wafer is pressed onto a rotating polishing pad, and a polishing liquid containing abrasive grains and chemicals flows between the wafer and the polishing pad. The surface material of the wafer is continuously removed under the chemical action of the polishing liquid and the mechanical action of the abrasive grains and the polishing pad. The more uniform the trajectory distribution of the abrasive grains on the surface of the silicon wafer and the relative friction length are, the smaller the surface material removal non-uniformity and the flatness error will be. Therefore, the polishing pad holes serve as a carrier for the abrasive material during grinding and polishing, and its size and distribution affect the distribution of the abrasive grains and the content of effective abrasive grains during the grinding and polishing, thereby affecting the surface material removal non-uniformity and surface flatness profile the polished silicon wafer.

The polishing powder is usually composed of cerium oxide, aluminum oxide, silicon oxide, iron oxide, zirconium oxide, chromium oxide and the like. Different materials have different hardnesses and different chemical properties in water, so the use occasions are different. Alumina and chromium oxide have a Mohs hardness of 9, cerium and zirconium oxide of 7, and iron oxide is even lower. Cerium oxide and silicate glass have high chemical activity and similar hardness, and are therefore widely used for polishing glass. The pure stoichiometric ratio $CeO_2$ has the characteristics of high melting point (2750K), high density (7.22 $g \cdot cm^{-3}$) and high lattice energy. Meanwhile, due to cubic crystal materials have a larger wiping force on glass than monoclinic materials (such as iron oxide, zirconium oxide, etc.), their polishing ability is stronger than that of zirconia and iron oxide polishing powder.

According to pore size, inorganic porous materials can be classified into microporous, mesoporous and macroporous materials. Inorganic microporous materials have a normal pore size, including wollastonite, activated carbon, zeolite, etc., wherein the most typical is synthetic zeolite molecular sieves. The pore size of the macroporous material is generally >50 nm, including porous ceramics, cement, aerogel, etc., which are characterized by a large pore size but a wide distribution range. Mesoporous materials are between the two, whose pore size is 2-50 nm, such as some aerogels, glass-ceramics, etc., wherein they have a much larger pore size than microporous materials, but such materials also have disadvantages such as irregular channel shape and a wide range of size distribution.

In addition, the conventional polishing pad process uses polymer microspheres which are mixed into the prepolymer and form pores after curing. In the conventional processes, the microspheres may be destroyed before use, and cannot form pores after being mixed into the prepolymer. In addition, the microspheres themselves may carry impurities that affect the wafer surface removal non-uniformity.

SUMMARY OF THE PRESENT INVENTION

For overcoming above defects, an object of the present invention is to provide a CMP layer based on porous cerium oxide, so as to solve problems that a channel shape of in a polishing pad is irregular, size distribution is wide, and polymer microspheres are too easily damaged to form pores after being mixed with a prepolymer. Another object of the present invention is to provide a preparation method of the CMP layer based on the porous cerium oxide, so as to achieve large-scale industrial production of the polishing layer.

Accordingly, the present invention provides a CMP (chemical mechanical to polishing) layer based on a porous cerium oxide, formed by mixing and curing a polyurethane prepolymer, a crosslinking agent and the porous cerium oxide.

Preferably, the polyurethane prepolymer is HC6575D product purchased from Shanghai Hecheng Polymer Materials Co., Ltd.

The porous cerium oxide has properties of a macroporous material, wherein a specific surface area is large, and a pore diameter can be adjusted from several nanometers to several hundred nanometers. In the present invention, according to the needs of the process, different pore sizes of the porous cerium oxide can be designed according to the different particle diameters of the abrasive grains in the polishing liquid, and the different effects of grinding and polishing can be achieved. Cerium oxide itself is a common abrasive grain with a Mohs hardness of 7.

The porous cerium oxide material of the present invention is prepared as follows: placing a 500 ml glass flask in a water bath at 70° C., and simultaneously adding $H_2O$, $Na_2SO_4$, $KH_2PO_4$, and St; adding nitrogen to discharge air in the flask, and adding SSS and KPS to react in N2; reacting with a stirring speed of 200 rpm at 70° C. for 7-8 h, and removing a stopper; heating to 80° C. and evaporating residual monomer small molecules for 1 h; cooling and collecting a product; centrifuging a prepared polystyrene emulsion at 7200 r·min-1 for 50 min, selecting supernatant liquid, and drying to obtain a gel template; in order to avoid template fracture during filling, heating the template at 100° C. for 5 min to slightly sinter microspheres, so as to enhance a mechanical strength of the template; dissolving 0.02 mol $Ce(NO_3)_3 \cdot 6H_2O$ in 20 ml 95% ethanol, and adding an appropriate amount of citric acid, wherein a molar ratio of the cerium nitrate to the citric acid satisfies 1:1; stirring the mixture 60° C. for 10 h to form a slightly yellow liquid; immersing the template in the mixture for 10 min; filtering and then drying at 60° C. for 60 min; repeating the above immersing, filtering and drying processes 3 times, and placing the treated template in a tube furnace; heating to 300° C. at a rate of 3° C.·min$^{-1}$ under air flow, and keeping the temperature for 4 h, then heating to 450° C. and keeping for 3 h; and naturally cooling for obtaining a three-dimensional ordered macroporous $CeO_2$.

The three-dimensional ordered macroporous $CeO_2$ prepared by the template method are hexagonal in order, as shown in FIG. 1. The arrangement is compact with a pore diameter of 250 nm, and a shrinkage rate is about 16%. The pores are connected by small windows to form a three-dimensional crosslinked channel system. In addition, XRD tests show that the material consists of cubic grains of $CeO_2$ with a particle size of 11 nm.

According to a preferred embodiment of the present invention, a weight ratio of the porous cerium oxide and the polyurethane prepolymer is 0.014-0.06:1, preferably 0.042:1.

According to a preferred embodiment of the present invention, the crosslinking agent is 3,3'-dichloro-4,4'-diaminodiphenylmethane (MOCA) or dimethylthiotoluenediamine (DMTDA).

A preparation method of a CMP layer based on a porous cerium oxide is provided, comprising steps of:

S1) placing a mold in an oven and preheating to 50-200° C., preferably 150° C.; placing a polyurethane prepolymer in a vacuum oven and preheating to 50-200° C., preferably 150° C., under vacuum; then adding a porous cerium oxide filler to the polyurethane prepolymer, and thoroughly mixing at a rotation speed of 20-300 r/min, preferably 120 r/min, to obtain a mixed prepolymer;

S2) moving the mixed prepolymer to a first tank, and performing heat preservation, stirring, and circulation treatments, wherein a temperature inside the first tank is 50-200° C., preferably 150° C., and a stirring speed is 20-300 r/min, preferably 120 r/min; meanwhile, circulating the mixed prepolymer in a pipeline between the first tank and an injection head, wherein a temperature in the pipeline is identical to the temperature inside the first tank;

S3) adding a crosslinking agent to a second tank and performing a melting treatment at a temperature of 60-200° C.; after the crosslinking agent in the second tank is completely melted, starting a cycle from the second tank to a pouring head, wherein a temperature of a pipeline between the second tank and the pouring head is identical to a temperature inside the second tank, wherein the temperature inside the second tank is preferably 120° C.;

S4) after the cycle is completed, correcting an injection weight ratio of the first tank and the second tank at the pouring head; and S5) taking out the mold preheated in the step S1, rapidly mixing materials in the first tank and the second tank by the injection head with a rotation speed of the injection head of 2000-5000 r/min, preferably 3500 r/min, so as to inject the materials into the mold; then placing the mold in the oven and curing for 30-150 min; after curing, taking out a polishing pad in the mold and vulcanizing at a temperature of 50-250° C. for 5-36 h, wherein a vulcanizing temperature is preferably 200° C.

According to a preferred embodiment of the present invention, in the step S4, a weight ratio of the crosslinking agent and the mixed prepolymer is 5-9:5-1.

According to a preferred embodiment of the present invention, in the step S4, a weight ratio of the crosslinking agent and the mixed prepolymer is 3:2.

Compared with conventional technologies, beneficial effects of the present invention are as follows:

(1) In the present invention, the macroporous cerium oxide in the CMP layer has a certain lattice morphology, which breaks up to form sharp corners during polishing, so as to improve polishing efficiency. In addition, the ordered pores in the macroporous cerium oxide can contain abrasive grains. When the macroporous cerium oxide is in contact with a wafer, rolling friction and sliding friction are simultaneously presented, which can greatly improve grinding and polishing efficiency.

(2) A crystal form of the macroporous cerium oxide in the CMP layer of the present invention is single crystal particles agglomerated together, and the single crystal particle determines machinability, wear resistance and fluidity of the macroporous cerium oxide. Spherical particles of the cerium oxide have good machinability, wear resistance and fluidity. In terms of wafer removal efficiency, the sliding friction between the abrasive grains and the wafers is most effective, followed by the rolling friction. The least efficient is face contact between the polyurethane and the wafer. Therefore, with same abrasive grains, a surface material removal non-uniformity effect of the porous cerium oxide polishing pad is better than that of the polishing pad of the conventional technologies.

BRIEF DESCRIPTION OF THE DRAWINGS

The present invention will be further described in detail with reference to the accompanying drawings and embodiments.

DETAILED DESCRIPTION OF THE PREFERRED EMBODIMENT

Figure 1:
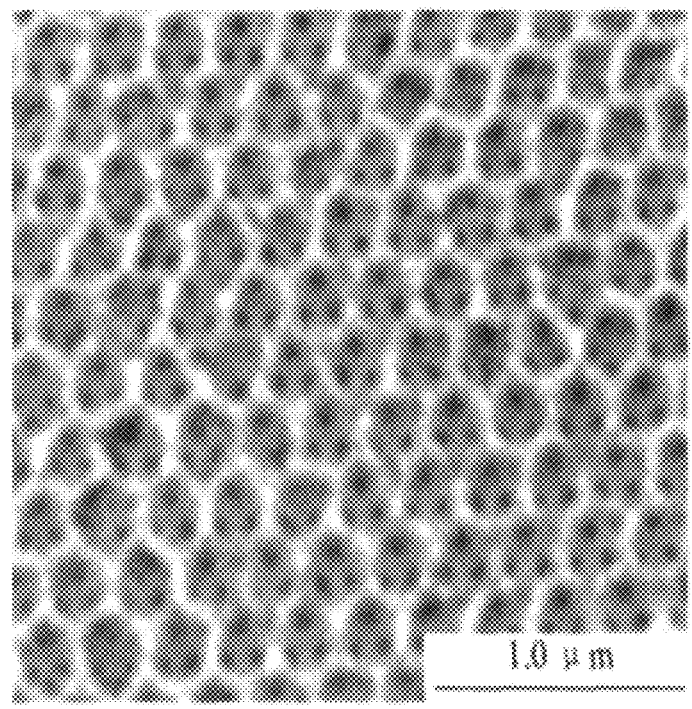
FIG. 1 is a microscopic molecular structure diagram of a porous cerium oxide material provided by the present invention.

The present invention will be further illustrated with the following specific embodiments. It is to be understood that the embodiments are not intended to limit the scope of the present invention. In addition, it should be understood that various changes and modifications may be made by those skilled in the art with the teachings of the present invention.

Embodiment 1

Placing a mold in an oven and preheating to 50° C.; placing 5000 g polyurethane prepolymer in a vacuum oven and preheating to 50° C. under vacuum; then adding 70 g porous cerium oxide filler to the polyurethane prepolymer, and thoroughly mixing at a rotation speed of 20 r/min to obtain a mixed prepolymer.

Moving the mixed prepolymer to a first tank, and performing heat preservation, stirring, and circulation treatments, wherein a temperature inside the first tank is 50° C., and a stirring speed is 20 r/min; meanwhile, circulating the mixed prepolymer in a pipeline between the first tank and an injection head, wherein a temperature in the pipeline is identical to the temperature inside the first tank.

Adding MOCA to a second tank and performing a melting treatment at a temperature of 60° C.; after the MOCA in the second tank is completely melted, starting a cycle from the second tank to a pouring head, wherein a temperature of a pipeline between the second tank and the pouring head is identical to a temperature inside the second tank.

After the cycle is completed, correcting an injection weight ratio of the first tank and the second tank at the pouring head to 5:1; taking out the mold, rapidly mixing materials in the first tank and the second tank by the injection head with a rotation speed of the injection head of 2000 r/min, so as to inject the materials into the mold; then placing the mold in the oven and curing for 30 min; after curing, taking out a polishing pad in the mold and vulcanizing at a temperature of 50° C. for 36 h.

Embodiment 2

Placing a mold in an oven and preheating to 150° C.; placing 5000 g polyurethane prepolymer in a vacuum oven and preheating to 50° C. under vacuum; then adding 220 g porous cerium oxide filler to the polyurethane prepolymer, and thoroughly mixing at a rotation speed of 120 r/min to obtain a mixed prepolymer.

Moving the mixed prepolymer to a first tank, and performing heat preservation, stirring, and circulation treatments, wherein a temperature inside the first tank is 150° C., and a stirring speed is 120 r/min; meanwhile, circulating the mixed prepolymer in a pipeline between the first tank and an injection head, wherein a temperature in the pipeline is identical to the temperature inside the first tank.

Adding DMTDA to a second tank and performing a melting treatment at a temperature of 150° C.; after the DMTDA in the second tank is completely melted, starting a cycle from the second tank to a pouring head, wherein a temperature of a pipeline between the second tank and the pouring head is identical to a temperature inside the second tank.

After the cycle is completed, correcting an injection weight ratio of the first tank and the second tank at the pouring head to 3:2; taking out the mold, rapidly mixing materials in the first tank and the second tank by the injection head with a rotation speed of the injection head of 3500 r/min, so as to inject the materials into the mold; then placing the mold in the oven and curing for 120 min; after curing, taking out a polishing pad in the mold and vulcanizing at a temperature of 200° C. for 24 h.

Embodiment 3

Placing a mold in an oven and preheating to 200° C.; placing 5000 g polyurethane prepolymer in a vacuum oven and preheating to 50° C. under vacuum; then adding 300 g porous cerium oxide tiller to the polyurethane prepolymer, and thoroughly mixing at a rotation speed of 300 r/min to obtain a mixed prepolymer.

Moving the mixed prepolymer to a first tank, and performing heat preservation, stirring, and circulation treatments, wherein a temperature inside the first tank is 200° C., and a stirring speed is 150 r/min; meanwhile, circulating the mixed prepolymer in a pipeline between the first tank and an injection head, wherein a temperature in the pipeline is identical to the temperature inside the first tank.

Adding a crosslinking agent to a second tank and performing a melting treatment at a temperature of 200° C.; after the crosslinking agent in the second tank is completely melted, starting a cycle from the second tank to a pouring head, wherein a temperature of a pipeline between the second tank and the pouring head is identical to a temperature inside the second tank.

After the cycle is completed, correcting an injection weight ratio of the first tank and the second tank at the pouring head to 9:1; taking out the mold, rapidly mixing materials in the first tank and the second tank by the injection head with a rotation speed of the injection head of 5000 r/min, so as to inject the materials into the mold; then placing the mold in the oven and curing for 150 min, after curing, taking out a polishing pad in the mold and vulcanizing at a temperature of 250° C. for 5 h.

In order to verify the effects of the present invention and the preparation method thereof, relevant parameters of the products of the above embodiments are detected.

Wafer Removal Rate Detection

Experimental material: The polishing layer prepared in the embodiment 2 is pasted to a substrate to form a polishing pad to be compared with a conventional IC1010 polishing pad, and a wafer is a Seasol Disk C4.

Detection method: respectively polishing the wafer with the polishing pad provided by the present invention and the IC1010, wherein a wafer removal rate RR (A/min) is tested with interval. The wafer removal rate refers to a wafer thickness removed within a unit time, which is determined by measuring a thickness of the wafer before and after polishing, and then dividing the thickness difference of the wafer by a corresponding time to calculate a polishing rate, namely the wafer removal rate. Each wafer is tested for 21 points along a diameter direction, and data of each point are measured with intervals of 0.5H, 2H, 5H, and 8H, wherein three sets of data are collected for each time, and average values are used as results.

Figure 2:
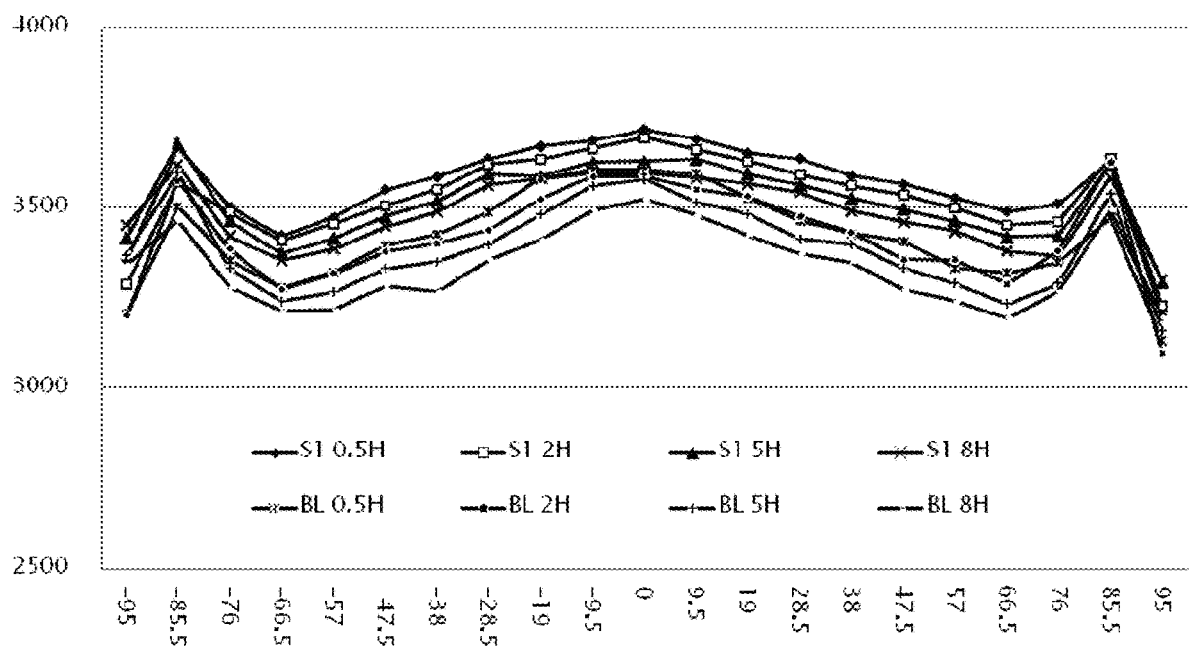
FIG. 2 illustrates grinding and polishing data when a pore diameter of the porous cerium oxide of the present invention is 110% of a particle diameter of abrasive grains.
Figure 3:
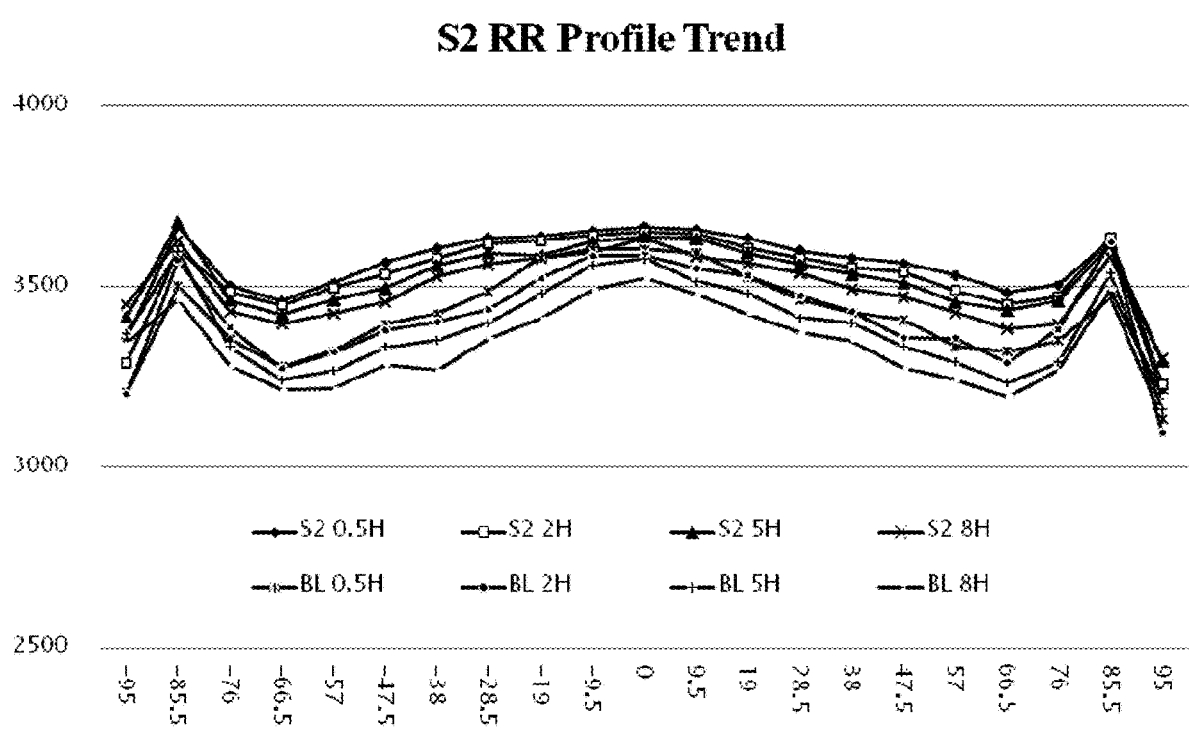
FIG. 3 illustrates grinding and polishing data when the pore diameter of the porous cerium oxide of the present invention is 200% of the particle diameter of the abrasive grains.

In the experiment, a selected abrasive grain size is 50 nm. FIG. 2 illustrates grinding and polishing data when a pore diameter of the porous cerium oxide of the present invention is 110% of a particle diameter of abrasive grains; FIG. 3 illustrates grinding and polishing data when the pore diameter of the porous cerium oxide of the present invention is 200% of the particle diameter of the abrasive grains.

Referring to FIGS. 2 and 3, by comparing polishing data of the conventional IC1010 polishing pad and the porous cerium oxide polishing pad provided by the present invention, it is known that the porous cerium oxide polishing pad has a significantly higher polishing rate over the IC1010 polishing pad at each time, and flatness is also better than that of the IC1010 polishing pad. In addition, a relationship between the porous cerium oxide polishing pad of different pore diameters and the abrasive grains is also obtained through the experiment, wherein the removal effect of the wafer surface is better when the pore size of the porous cerium oxide of the present invention is in the range of 110-200% of the particle diameter of the abrasive grain.

The above embodiments are only preferred embodiments of the present invention, and are not intended to limit the scope of the present invention. The scope of the present invention is defined by the following claims. All equivalent structural changes made with hint of the description of the present invention are intended to be included within the scope of the present invention.

What is claimed is:

1. A CMP (chemical mechanical polishing) layer based on a macroporous cerium oxide, formed by mixing and curing a polyurethane prepolymer, a crosslinking agent and the macroporous cerium oxide:

wherein ordered pores in the macroporous cerium oxide contain abrasive grains, a crystal form of the macroporous cerium oxide in the CMP layer is single crystal particles agglomerated together.

2. The CMP layer, as recited in claim 1, wherein a weight ratio of the macroporous cerium oxide and the polyurethane prepolymer is 0.014-0.06:1.

3. The CMP layer, as recited in claim 1, wherein the crosslinking agent is 3,3'-dichloro-4,4'-diaminodiphenyl-methane or dimethylthiotoluenediamine.

* * * * *